United States Patent [19]
Boustany et al.

[11] 3,817,948
[45] June 18, 1974

[54] 2-AMINOBENZOAZOLES AS ACTIVATORS FOR VULCANIZATION OF RUBBER

[75] Inventors: Kamel Boustany, Akron, Ohio; John Joseph D'Amico, Saint Louis, Mo.

[73] Assignee: Monsanto Company, St. Louis, Mo.

[22] Filed: July 19, 1972

[21] Appl. No.: 273,173

[52] U.S. Cl............ 260/79.5 B, 260/784, 260/788
[51] Int. Cl...... C08c 11/52, C08c 9/00, C08f 27/06
[58] Field of Search................ 260/79,5 B, 784, 788

[56] References Cited
UNITED STATES PATENTS

| | | | |
|---|---|---|---|
| 1,546,713 | 7/1925 | Bruni | 260/788 |
| 2,261,042 | 10/1941 | Williams | 260/788 |
| 2,863,874 | 12/1958 | Gregory | 260/306.8 |
| 2,945,834 | 7/1960 | Coutler | 260/41.5 |
| 3,094,496 | 6/1963 | Walker | 260/5 |

Primary Examiner—Joseph J. Schofer
Assistant Examiner—C. A. Henderson, Jr.

[57] ABSTRACT

A class of 2-aminobenzoazoles is described which is used with primary accelerators to enhance the vulcanization rate of rubber. The new vulcanization activators are characterized by the formula

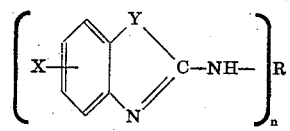

in which Y is oxygen or sulfur, X is hydrogen, alkyl, alkoxy, nitro, halo or hydroxy, and $n$ is one or two; when $n$ is one R is hydrogen, alkyl, aryl, cycloalkyl, aralkyl, hydroxyalkyl, or alkenyl; when $n$ is two R is alkylene. The conjoint use of the new activators with thiazole accelerators is particularly advantageous since the vulcanization rate is increased without affecting the processing safety of the vulcanizable composition.

16 Claims, No Drawings

2-AMINOBENZOAZOLES AS ACTIVATORS FOR VULCANIZATION OF RUBBER

This invention relates to vulcanizable compositions exhibiting improved cure characteristics and to methods of enhancing the vulcanization rate of rubber. More particularly, it relates to the use of activators with primary accelerators to further increase the vulcanization rate.

Activators, sometimes called secondary accelerators, are used by rubber manufacturers to improve the vulcanization process by reducing the time required to cure a vulcanizable composition. Amine activators commonly used, for example, diphenylguanidine, adversely affect the processing safety of the stocks and as a consequence, with certain stocks prevulcanization inhibitors may have to be used to avoid premature vulcanization. The activators of this invention exhibit a valuable combination of properties in that they activate the vulcanization cure rate without diminishing the processing safety. These and other advantages of the invention will become apparent as the description of the invention proceeds.

SUMMARY OF THE INVENTION

According to this invention the vulcanization rate of vulcanizable rubber compositions containing sulfur-vulcanizing agent and thiazole accelerator is enhanced by incorporating therein an effective amount of a compound of the formula

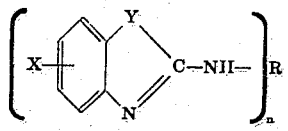

in which Y is oxygen or sulfur, X is hydrogen, lower alkyl, lower alkoxy, nitro, chloro, bromo, iodo, fluoro, or hydroxy and $n$ is one or two; when $n$ is one R is hydrogen, alkyl, aryl, cycloalkyl, aralkyl, hydroxyalkyl and alkenyl, when $n$ is two R is alkylene. In a preferred class of activators X is hydrogen, Y is sulfur, $n$ is one and R is an unsubstituted saturated aliphatic radical.

Alkyl is the radical derived by removal of one hydrogen atom from an alkane which radical has the formula $C_nH_{2n+1}$. The alkyl radical may be primary, secondary or tertiary and the alkyl chains thereof may be branched or unbranched. Alkyl radicals of 1–20 carbon atoms are suitable with radicals of 1–10 carbon atoms being preferred. According to this invention lower alkyl means radicals of 1–5 carbon atoms. Cycloalkyl radicals of 5–12 carbon atoms are suitable with radicals of 5–8 carbon atoms being preferred. Aralkyl is a monovalent alkyl radical having a phenyl radical attached to a carbon atom of the alkyl chain. Aralkyl radicals of 7–10 carbon atoms are preferred. Aryl is a monovalent radical derived by removal of one hydrogen atom from an aromatic hydrocarbon. The aryl radical may be substituted in the aromatic nucleus by lower alkyl groups. Aryl radicals of 6–12 carbon atoms are suitable. Phenyl is the preferred aryl radical but radicals of the naphthalene series are suitable. Hydroxyalkyl is a radical derived by removal of a hydrogen atom from a carbon atom of an aliphatic alcohol. The alkyl radical is the same as above except one hydrogen atom is replaced by hydroxy. Alkenyl is the radical derived by removal of one hydrogen atom from an alkene which radical has the formula $C_nH_{2n-1}$. Alkenyl radicals of 1–8 carbon atoms are preferred. Alkylene means a divalent alkyl radical wherein each valence is attached to an acyclic or cyclic aliphatic carbon atom. Alkylene radicals of 1–8 carbon atoms are preferred. The alkylene chain may be interrupted by a phenylene radical.

Examples of R are methyl, ethyl, propyl, isopropyl, butyl, isobutyl, sec-butyl, tert-butyl, amyl, hexyl, octyl, decyl, dodecyl, cetyl, eicosyl, cyclopentyl, cyclohexyl, cyclooctyl, cyclodecyl, cyclododecyl, benzyl, alpha-methyl benzyl, alpha,alpha-dimethyl benzyl, phenethyl, xylyl, phenyl, naphthyl, tolyl, 4-ethyl phenyl, ethyltolyl, propylphenyl, butylphenyl, hexylphenyl, hydroxymethyl, 2-hydroxyethyl, 2-hydroxypropyl, 3-hydroxypropyl, vinyl, allyl, butenyl, methylene, dimethylene, trimethylene, 1-methyl-dimethylene, tetramethylene, pentamethylene, hexamethylene, heptamethylene, octamethylene, 1,4-dimethyltetramethylene, xylylene and cyclohexylene.

Illustrative examples of suitable activators of the invention are 2-aminobenzothiazole, 2-(N-methylamino)benzothiazole, 2-(N-isopropylamino)-benzothiazole, 2-(N-tert-butylamino)benzothiazole, 2-(N-ethylamino)-5-chlorobenzothiazole, 2-(N-butylamino)-6-hydroxybenzothiazole, 2-(N-methylamino)-6-ethoxybenzothiazole, 2-(N-amylamino)-4-methylbenzothiazole, 2-(N-hexylamino)benzothiazole, 2-(N-cyclohexylamino)benzothiazole, 2-(anilino)benzothiazole, 2-(N-benzylamino)benzothiazole, 2-(N-tolylamino)benzothiazole, 2-(N-3-hydroxypropylamino)benzothiazole, 2-(N-allylamino)benzothiazole, N,N'-bis(2-benzothiazolyl)ethylenediamine and similar 2-aminobenzoxazoles. Further examples of suitable 2-aminoazoles are described in the following references which are incorporated herein by reference: J. Chem. Soc., 1561 (1958), J. Chem. Soc., 3311 (1949), J. Chem. Soc., 2951 (1926), and J. Pharm. Sci., 53, 538 (1964).

The improved compositions of the invention comprise diene rubber, sulfur-vulcanizing agent, thiazole accelerator and an amount effective to enhance the vulcanization rate of the composition of a 2-aminoazole of this invention. Of course, the composition may contain additional components which are normally elements of vulcanizable compositions. The 2-aminoazoles are incorporated into the composition by milling or mixing in accordance with conventional procedures. The compositions are then heated to effect vulcanization. The temperature and time at which the compositions are cured varies depending upon the amounts and type of components in the vulcanizable composition. Generally, the temperature is between 180°–450°F and the time is between a few minutes to an hour or more. At all cure conditions normally encountered, the activators of the invention enhanced the vulcanization rate.

The activators of the invention can be used in natural and synthetic rubbers and mixtures thereof. Any diene rubber having sufficient unsaturation to be sulfur vulcanizable is suitable with synthetic rubber being preferred. Examples of suitable synthetic rubbers are styrene-butadiene copolymer (SBR), isobutylene-isoprene copolymer (butyl), ethylene-propylene diene terpolymer (EPDM), butadiene-acrylonitrile copolymer (nitrile), polymers of chloroprene (neoprene) and synthetic polybutadiene, particularly cis-polyisoprene and cis-polybutadiene.

For the purposes of this invention, sulfur-vulcanizing agent means elemental sulfur or sulfur-containing vulcanizing agent, for example, an amine disulfide or a polymeric polysulfide. The various types of sulfur-containing vulcanizing agents are known to those skilled in the art of rubber vulcanization.

The primary accelerators may comprise any of the thiazole vulcanization accelerators and mixtures thereof known to the art. Suitable thiazole accelerators are 2-mercaptobenzothiazole, bis(2-benzothiazolyl)disulfide, and 2-benzothiazolesulfenamides and thiosulfenamides. The sulfenamides may be represented by the formula

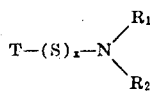

in which T is 2-benzothiazolyl or substituted-2-benzothiazolyl, $x$ is one or two, $R_1$ and $R_2$ of 1–20 carbon atoms are independently alkyl, benzyl, phenyl or cycloalkyl and one may be hydrogen, or $R_1$ and $R_2$ may be alkylene which along with the nitrogen atom to which they are attached form a heterocyclic radical. The alkylene radical may be interrupted by another hetero-atom such as —O—, —S—, or —NH—. The amount of primary accelerator is generally between 0.2–2.0 parts per 100 parts rubber with 0.5–1.5 parts being preferred.

The amount of activator for the practice of the invention depends upon other components in the vulcanizable composition. Generally, small amounts are sufficient to enhance the vulcanization rate. Usually the quantity is between 0.1 to 4.0 parts per 100 parts rubber with about 1–2 parts being preferred, however, even larger amounts may be used if desired.

time ($t_5$) in minutes required for the Mooney reading to rise five points above the minimum viscosity is recorded. Longer times on the Mooney Scorch test are indicative of greater processing safety. The cure characteristics of the stocks are determined by a Monsanto Oscillating Disk Rheometer at the indicated temperature. The time ($t_2$) in minutes required for a rise of two Rheometer units above the minimum reading and the time ($t_{90}$) required to obtain 90% of the Rheometer maximum torque are recorded. The difference ($t_{90}-t_2$) is indicative of the cure rate of the stock. Small values of $t_{90}-t_2$ indicate faster cure times. Vulcanizates are prepared by press curing the stocks at the indicated temperature for the time required to achieve optimum cure as determined from Rheometer data and the physical properties of the vulcanizates are measured and recorded.

The following styrene-butadiene rubber masterbatch is prepared to illustrate the properties of the activators of this invention. All parts are by weight.

SBR Masterbatch

| | |
|---|---|
| Oil-extended styrene-butadiene rubber | 137.5 |
| Zinc oxide | 3.0 |
| Stearic Acid | 1.0 |
| Furnace carbon black | 65.0 |
| Hydrocarbon softener | 1.5 |
| TOTAL | 208.0 |

Vulcanizable compositions are prepared by mixing sulfur, accelerator and activator with portions of the masterbatch. To some stocks, an antidegradant or scorch inhibitor or both are added. The properties of the stocks are determined as previously described and are shown in Tables I–VI.

TABLE I

| Stock | 1 | 2 | 3 | 4 | 5 | 6 |
|---|---|---|---|---|---|---|
| SBR Masterbatch | 208 | | | | | |
| Sulfur | 2.0 | | | | | |
| N-1,3-dimethylbutyl-N'-phenyl-p-phenylenediamine | 2.0 | | | | | |
| N-(Cyclohexylthio)phthalimide | 0.2 | | | | | |
| N-tert-butyl-2-benzothiazole-sulfenamide | 1.0 | | | | | |
| 2-aminobenzothiazole | — | 0.2 | 0.4 | 0.8 | 1.6 | 2.0 |
| Mooney Data at 135°C | | | | | | |
| $t_5$, minutes | 27.9 | 27.5 | 28.8 | 30.4 | 28.5 | 27.9 |
| Rheometer Data at 153°C | | | | | | |
| $t_2$, minutes | 9.5 | 9.0 | 9.5 | 9.5 | 9.5 | 9.5 |
| $t_{90}$, minutes | 28.5 | 27.0 | 27.5 | 26.5 | 24.5 | 23.5 |
| $t_{90}-t_2$ | 19.0 | 18.0 | 18.5 | 17.0 | 15.0 | 14.0 |
| Stress-Strain Data at 153°C | | | | | | |
| Cure time, minutes | 50 | 45 | 45 | 45 | 40 | 40 |
| 300% modulus, psi | 1250 | 1210 | 1360 | 1310 | 1200 | 1240 |
| Ult. tensile, psi | 2590 | 3150 | 3050 | 3200 | 2920 | 3020 |
| Ult. Elongation, % | 490 | 550 | 530 | 550 | 540 | 550 |

PREFERRED EMBODIMENTS

The following tables illustrate the improved vulcanization rates obtained by incorporating the activators into rubber. For all the rubber stocks tested, as illustrative of the invention, Mooney scorch time at 135°C is determined by means of a Mooney plastometer. The The data of Table I show the results of a concentration study using 2-aminobenzothiazole as activator. The results indicate that the processing safety of the stocks is essentially unaffected, even at high concentrations, by the activator. The Rheometer data show that the time required to obtain 90% of maximum torque decreases with increasing amounts of activator. For example, comparison of Rheometer data of control Stock 1 with no activator with Stock 6 with 2 parts of activator shows that the value of $t_{90}$ of the stock containing activator is five minutes less than the control. The stress-strain data further illustrate the shorter times required to cure stocks containing the activator.

The activity of 2-aminobenzothiazole as an activator is further illustrated with five different primary accelerators in Table II. The results show that with each accelerator the activator enhances the vulcanization rate as shown by the Rheometer data and cure times without affecting the processing safety. The data of Table III illustrate the effectiveness of 2-aminobenzothiazole to activate the cure of stocks containing scorch inhibitors. The results indicate that the processing safety of the stocks may be substantially increased with inhibitors and that the cure times may be maintained by use of the instant activators.

TABLE II

| Stock No. | 1 | 2 | 3 | 4 | 5 | 6 | 7 | 8 | 9 | 10 |
|---|---|---|---|---|---|---|---|---|---|---|
| SBR Masterbatch | 208 | | | | | | | | | |
| Sulfur | 2 | | | | | | | | | |
| N-1,3-dimethylbutyl-N'-phenyl-p-phenylenediamine | 2 | | | | | | | | 2.5 | 2.5 |
| 2-(2,6-Dimethyl-morpholinothio)benzothiazole | 1.0 | 1.0 | — | — | — | — | — | — | — | — |
| N,N-Diisopropyl-2-benzothiazolesulfenamide | — | — | 1.0 | 1.0 | — | — | — | — | — | — |
| 2-(Morpholinothio)benzothiazole | — | — | — | — | 1.0 | 1.0 | — | — | — | — |
| 2-(Morpholinodithio)benzothiazole | — | — | — | — | — | — | 1.0 | 1.0 | — | — |
| Bis-(2-benzothiazolyl)disulfide | — | — | — | — | — | — | — | — | 1.2 | 1.2 |
| 2-Aminobenzothiazole | — | 1.0 | — | 1.0 | — | 1.0 | — | 1.0 | — | 0.8 |
| Mooney data at 135°C | | | | | | | | | | |
| $t_5$, minutes | 29.8 | 28.3 | 32.2 | 27.0 | 26.3 | 26.1 | 13.4 | 15.2 | 12.0 | 11.4 |
| Rheometer Data at 153°C | | | | | | | | | | |
| $t_2$, minutes | 10.2 | 10.0 | 9.5 | 9.5 | 9.5 | 9.5 | 6.5 | 7.0 | 5.0 | 5.0 |
| $t_{90}$, minutes | 33.2 | 28.0 | 37.5 | 35.5 | 31.5 | 25.5 | 24.0 | 20.0 | 39.5 | 25.0 |
| $t_{90}-t_2$ | 23.0 | 18.0 | 28.0 | 26.0 | 22.0 | 16.0 | 17.5 | 13.0 | 34.5 | 20.0 |
| Stress-Strain Data at 153°C | | | | | | | | | | |
| Cure time, minutes | 55 | 45 | 60 | 55 | 55 | 45 | 45 | 35 | 80 | 55 |
| 300% Modulus, psi | 1250 | 1290 | 1300 | 1350 | 1260 | 1360 | 1200 | 1200 | 1480 | 1560 |
| Ult. Tensile Str., psi | 2950 | 3040 | 2900 | 3000 | 3110 | 3150 | 2600 | 2820 | 2690 | 2700 |
| Ult. Elongation, % | 520 | 520 | 500 | 520 | 540 | 540 | 510 | 520 | 450 | 430 |

TABLE III

| Stock No. | 1 | 2 | 3 | 4 | 5 |
|---|---|---|---|---|---|
| SBR Masterbatch | 208 | | | | |
| Sulfur | 2 | | | | |
| N-1,3-dimethylbutyl-N'-phenyl-p-phenylenediamine | 2 | | | | |
| N-tert-butyl-2-benzothiazole-sulfenamide | 1 | | | | |
| 2-Aminobenzothiazole | — | 2.0 | — | 1.0 | 2.0 |
| N-(Cyclohexylthio)phthalimide | — | — | 0.5 | 0.5 | 0.5 |
| Mooney Scorch Data at 135°C | | | | | |
| $t_5$, minutes | 22.5 | 22.9 | 40.4 | 40.0 | 37.4 |
| Rheometer Data at 153°C | | | | | |
| $t_2$, minutes | 11.0 | 11.0 | 16.5 | 16.2 | 16.0 |
| $t_{90}$, minutes | 29.5 | 23.0 | 38.7 | 33.8 | 30.5 |
| $t_{90}-t_2$ | 18.5 | 12.0 | 22.2 | 17.6 | 14.5 |
| Stress-Strain Data at 153°C | | | | | |
| Cure Time, minutes | 50 | 40 | 60 | 50 | 45 |
| 300% Modulus, psi | 1290 | 1340 | 1280 | 1250 | 1350 |
| Ult. Tensile, psi | 2940 | 2800 | 2800 | 2890 | 2900 |
| Ult. Elongation, % | 520 | 500 | 500 | 530 | 520 |

TABLE IV

| Stock No. | 1 | 2 | 3 | 4 | 5 |
|---|---|---|---|---|---|
| SBR Masterbatch | 208 | | | | |
| Sulfur | 2 | | | | |
| N-tert-2-benzothiazole sulfenamide | 1 | | | | |
| 2-Aminobenzothiazole | — | 2.0 | — | — | — |
| 2-(N-methylamino)benzothiazole | — | — | 2.0 | — | — |
| 2-(N-propylamino)benzoxazole | — | — | — | 2.0 | — |
| 2-(N-benzylamino)benzothiazole | — | — | — | — | 2.0 |
| Mooney Scorch Data at 135°C | | | | | |
| $t_5$, minutes | 19.3 | 21.3 | 18.9 | 20.1 | 19.9 |
| Rheometer Data at 153°C | | | | | |
| $t_2$, minutes | 9.3 | 9.0 | 8.9 | 9.2 | 9.0 |
| $t_{90}$, minutes | 27.0 | 19.7 | 19.9 | 19.0 | 21.0 |
| $t_{90}-t_2$ | 17.7 | 10.7 | 11.0 | 9.8 | 12.0 |

TABLE IV—Continued

| Stock No. | 1 | 2 | 3 | 4 | 5 |
|---|---|---|---|---|---|
| Stress-Strain Data at 153°C | | | | | |
| Cure Time, minutes | 50 | 40 | 40 | 40 | 40 |
| 300% Modulus, psi | 1310 | 1310 | 1450 | 1390 | 1310 |
| Ult. Tensile, psi | 2950 | 2890 | 3010 | 2650 | 3000 |
| Ult. Elongation, % | 500 | 500 | 490 | 480 | 520 |

TABLE V

| Stock No. | 1 | 2 | 3 | 4 | 5 |
|---|---|---|---|---|---|
| SBR Masterbatch | 208 | | | | |
| Sulfur | 2 | | | | |
| N-1,3-dimethylbutyl-N'-phenyl-p-phenylenediamine | 2 | | | | |
| N-tert-butyl-2-benzothiazole-sulfenamide | 1 | | | | |
| 2-Aminobenzothiazole | — | 1.0 | — | — | — |
| 2-Anilinobenzothiazole | — | — | 1.0 | — | — |
| 2-(N-2-hydroxyethylamino)-benzothiazole | — | — | — | 1.0 | — |
| 2-(N-allylamino)benzothiazole | — | — | — | — | 1.0 |
| Mooney Scorch Data at 135°C | | | | | |
| $t_5$, minutes | 19.0 | 19.7 | 20.0 | 17.4 | 19.5 |
| Rheometer Data at 153°C | | | | | |
| $t_2$, minutes | 9.8 | 9.8 | 10.0 | 9.0 | 10.0 |
| $t_{90}$, minutes | 25.0 | 21.0 | 24.0 | 19.5 | 20.0 |
| $t_{90}-t_2$ | 15.2 | 11.2 | 14.0 | 10.5 | 10.0 |
| Stress-Strain Data at 153°C | | | | | |
| Cure Time, minutes | 40 | 35 | 40 | 35 | 35 |
| 300% Modulus, psi | 1140 | 1200 | 1140 | 1290 | 1200 |
| Ult. tensile, psi | 2840 | 2750 | 2990 | 2400 | 2790 |
| Ult. Elongation, % | 550 | 520 | 570 | 450 | 520 |

TABLE VI

| Stock No. | 1 | 2 | 3 | 4 |
|---|---|---|---|---|
| SBR Masterbatch | 208 | | | |
| Sulfur | 2 | | | |
| N-1,3-dimethylbutyl-N'-phenyl-p-phenylenediamine | 2 | | | |
| N-tert-butyl-2-benzothiazole-sulfenamide | 1 | | | |
| 2-(N-methylamino)-6-nitrobenzothiazole | — | 1.0 | — | — |
| 2-(N-methylamino)benzothiazole | — | — | 1.0 | — |
| N,N'-bis(2-benzothiazolyl)-ethylenediamine | — | — | — | 1.0 |
| Mooney Scorch Data at 135°C | | | | |
| $t_5$, minutes | 19.9 | 18.7 | 20.3 | 20.0 |
| Rheometer Data at 153°C | | | | |
| $t_2$, minutes | 10.5 | 10.1 | 10.5 | 10.5 |
| $t_{90}$, minutes | 29.0 | 27.5 | 25.0 | 26.5 |
| $t_{90}-t_2$ | 19.5 | 17.4 | 14.5 | 16.0 |
| Stress-Strain Data at 153°C | | | | |
| Cure time, minutes | 50 | 45 | 45 | 45 |
| 300% Modulus, psi | 1250 | 1160 | 1240 | 1210 |
| Ult. Tensile, psi | 2940 | 2930 | 2800 | 2880 |
| Ult. Elongation, % | 540 | 550 | 500 | 540 |

The activity of a number of different N-substituted benzoazoles is illustrated in Tables IV, V and VI. Examples of benzothiazole, substituted-benzothiazole, bis(benzothiazolyl) and benzoxazole activators and activators with alkyl, aryl, aralkyl, hydroxyalkyl and alkenyl amino substituents are illustrated.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. The vulcanizable composition comprising styrene-butadiene rubber, sulfur-vulcanizing agent, thiazole accelerator and an amount effective to enhance the vulcanization rate of the composition of a compound of the formula

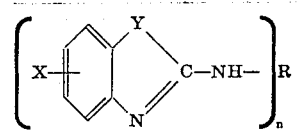

in which Y is oxygen or sulfur, X is hydrogen, lower alkyl, lower alkoxy, nitro, halo or hydroxy, and *n* is one or two; when *n* is one R is hydrogen, alkyl of 1–20 carbon atoms, aryl of 6–12 carbon atoms, cycloalkyl of 5–12 carbon atoms, aralkyl of 7–10 carbon atoms, hydroxyalkyl of 1–20 carbon atoms, or alkenyl of 1–8 carbon atoms, when *n* is two R is alkylene of 1–8 carbon atoms.

2. The composition of claim 1 in which X is hydrogen, Y is sulfur, and *n* is one.

3. The composition of claim 2 in which R is hydrogen.

4. The composition of claim 2 in which R is lower alkyl.

5. The composition of claim 2 in which R is methyl.

6. The composition of claim 2 in which R is allyl.

7. The composition of claim 2 in which R is benzyl.

8. The composition of claim 2 in which the sulfur-vulcanizing agent is sulfur and the accelerator is 2-benzothiazolesulfenamide.

9. The process for vulcanizing styrene-butadiene rubber compositions containing sulfur-vulcanizing agent and thiazole accelerator which comprises incorporating into the composition an amount effective to enhance the vulcanization rate of the composition of the compound of the formula

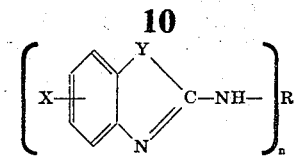

in which Y is oxygen or sulfur, X is hydrogen, lower alkyl, lower alkoxy, nitro, halo, or hydroxy, and *n* is one or two; when *n* is one R is hydrogen, alkyl of 1–20 carbon atoms, aryl of 6–12 carbon atoms, cycloalkyl of 5–12 carbon atoms, aralkyl of 7–10 carbon atoms, hydroxyalkyl of 1–20 carbon atoms, or alkenyl of 1–8 carbon atoms, when *n* is two R is alkylene of 1–8 carbon atoms and heating to effect vulcanization.

10. The process of claim 9 in which X is hydrogen, Y is sulfur, and *n* is one.

11. The process of claim 9 in which R is hydrogen.

12. The process of claim 9 in which R is lower alkyl.

13. The process of claim 9 in which R is methyl.

14. The process of claim 9 in which R is allyl.

15. The process of claim 9 in which R is benzyl.

16. The process of claim 9 in which the sulfur-vulcanizing agent is sulfur and the accelerator is a 2-benzothiazolesulfenamide.

17. The composition of claim 2 in which R is 2-hydroxyethyl.

18. The process of claim 9 in which R is 2-hydroxyethyl.

* * * * *